US00RE46566E

(19) United States
(12) Reissued Patent
Lee

(10) Patent Number: US RE46,566 E
(45) Date of Reissued Patent: Oct. 3, 2017

(54) METHOD OF PROCESSING DATA IN INTERNET PROTOCOL TELEVISION RECEIVER AND INTERNET PROTOCOL TELEVISION RECEIVER

(71) Applicant: LG Electronics Inc., Seoul (KR)

(72) Inventor: Joon Hui Lee, Seoul (KR)

(73) Assignee: LG ELECTRONICS INC., Seoul (KR)

(21) Appl. No.: 14/878,724

(22) Filed: Oct. 8, 2015

Related U.S. Patent Documents

Reissue of:
(64) Patent No.: 8,554,922
Issued: Oct. 8, 2013
Appl. No.: 12/382,183
Filed: Mar. 10, 2009

U.S. Applications:
(60) Provisional application No. 61/042,256, filed on Apr. 3, 2008, provisional application No. 61/038,421, filed on Mar. 21, 2008.

(30) Foreign Application Priority Data

Jan. 15, 2009 (KR) ..... 10-2009-0003305

(51) Int. Cl.
*G06F 15/16* (2006.01)
*H04L 29/06* (2006.01)
*H04L 29/12* (2006.01)

(52) U.S. Cl.
CPC .... *H04L 65/1069* (2013.01); *H04L 29/12594* (2013.01); *H04L 61/3085* (2013.01);
(Continued)

(58) Field of Classification Search
CPC ..... H04L 65/1069; H04L 65/4084; H04L 65/1016; H04L 65/1006; H04L 29/12594; H04L 61/3085
(Continued)

(56) References Cited

U.S. PATENT DOCUMENTS 7,945,936 B2 * 5/2011 Yamagishi et al. ..... 757/97
2004/0184432 A1 * 9/2004 Gateva et al. ..... 370/349
(Continued)

FOREIGN PATENT DOCUMENTS

EP 1 988 666 11/2008
EP 2 031 828 3/2009
(Continued)

OTHER PUBLICATIONS

Mikoczy et al.: "IMS based IPTV services—Architecture and Implementation", Mobimedia—Proceedings of the 3rd International Conference on Mobile Multimedia Communications, Aug. 1, 2007, XP007908230.

(Continued)

*Primary Examiner* — Joshua Campbell
(74) *Attorney, Agent, or Firm* — Dentons US LLP

(57) ABSTRACT

A method of processing data in an IPTV receiver and such an IPTV receiver are disclosed. The method includes transmitting a request signal for resolution of a content reference identifier (CRID) corresponding to a content, receiving location information including a session initiation protocol-uniform resource identifier (SIP-URI) and a session description protocol-uniform resource locator (SDP-URL), wherein the SIP-URI and the SDP-URL correspond to the CRID, requesting a server corresponding to the SDP-URL to transmit a session description protocol (SDP) file by using the received SDP-URL, and receiving the SDP file from the server.

3 Claims, 9 Drawing Sheets

(52) U.S. Cl.
CPC ..... *H04L 65/4084* (2013.01); *H04L 65/1006* (2013.01); *H04L 65/1016* (2013.01)

(58) Field of Classification Search
USPC ..... 709/206, 227; 725/25, 32, 97
See application file for complete search history.

(56) References Cited

U.S. PATENT DOCUMENTS

| | | | | |
|---|---|---|---|---|
| 2006/0248181 | A1* | 11/2006 | Glassco et al. | 709/223 |
| 2009/0077181 | A1* | 3/2009 | Chen | 709/206 |

FOREIGN PATENT DOCUMENTS

| | | | |
|---|---|---|---|
| KR | 10-2007-0047901 | A | 5/2007 |
| KR | 10-2008-0030901 | A | 4/2008 |
| WO | 2007/093126 | | 8/2007 |

OTHER PUBLICATIONS

"Broadcast and On-line Services: Search, select and rightful use of content on personal storage systems (TV-anytime); Part 4: Phase 1—Content referencing; ETSI TS 102 822-4", ETSI Standards, Nov. 1, 2007, XP014040520.
Open IPTV Forum: "Open IPTV Forum Functional Architecture V 1.1", Jan. 15, 2008, XP007906507.

* cited by examiner

FIG. 3

```
<simpleType name="SDPDeliveryModeType">
 <restriction base="string">
  <enumeration value=" directRef"/>
</restriction>
</simpleType>
<complexType name="TimeAndURLType">
 <simpleContent>
  <extension base="anyURI">
   <attribute name="mode" type="cr:DeliveryModeType" use="optional" default="scheduled"/>
   <attribute name="start" type="dateTime" use="required"/>
   <attribute name="duration" type="duration" use="optional"/>
   <attribute name="end" type="dateTime" use="optional"/>
   <attribute name="instanceMetadataId" type="tva:InstanceMetadataIdType" use="optional"/>
   <attribute name="SDPMode" type="cr:SDPDeliveryModeType" use="optional"/>
   <attribute name="SDPURI" type="anyURI"/>
</extension>
 </simpleContent>
</complexType>
```

FIG. 5

```
<?xml version="1.0" encoding="UTF-8"?>
<schema targetNamespace="urn:tva:ContentReferencing:2005"
xmlns:metadata="urn:tva:metadata:2005" xmlns="http://www.w3.org/2001/XMLSchema"
xmlns:CR="urn:tva:ContentReferencing:2005">
<element name="ContentReferencingTable" type="CR:ContentReferencingTableType">
  <annotation>
    <documentation>A document conforming to the TV Anytime content referencing
specification</documentation>
  </annotation>
</element>
<complexType name="ContentReferencingTableType">
  <sequence>
    <element name="Result" type="CR:ResultType" minOccurs="0" maxOccurs="unbounded"/>
  </sequence>
  <attribute name="version" type="float" use="required"/>
</complexType>
<simpleType name="AcquisitionDirectiveType">
  <restriction base="string">
    <enumeration value="all"/>
    <enumeration value="any"/>
  </restriction>
</simpleType>
<simpleType name="ResolutionStatusType">
  <restriction base="string">
    <enumeration value="resolved"/>
    <enumeration value="discard CRID"/>
    <enumeration value="cannot yet resolve"/>
    <enumeration value="unable to resolve"/>
  </restriction>
</simpleType>
<complexType name="ResultType">
  <choice>
    <sequence>
      <element name="CRIDResult" type="CR:CRIDResultType" minOccurs="0"
maxOccurs="unbounded"/>
    </sequence>
    <sequence>
      <element name="LocationsResult" type="CR:LocationsResultType" minOccurs="0"
maxOccurs="unbounded"/>
    </sequence>
  </choice>
  <attribute name="CRID" type="metadata:CRIDType" use="required"/>
  <attribute name="complete" type="boolean" use="required"/>
  <attribute name="acquire" type="CR:AcquisitionDirectiveType" use="required"/>
  <attribute name="status" type="CR:ResolutionStatusType" use="required"/>
  <attribute name="reresolveDate" type="dateTime" use="optional"/>
</complexType>
<complexType name="CRIDResultType">
  <sequence>
    <element name="Crid" type="metadata:CRIDType" maxOccurs="unbounded"/>
  </sequence>
</complexType>
```

FIG. 6

```
<complexType name="LocatorType">
 <simpleContent>
  <extension base="anyURI">
   <attribute name="instanceMetadataId" type="metadata:InstanceMetadataIdType"
use="optional"/>
  </extension>
 </simpleContent>
</complexType>
<simpleType name="DeliveryModeType">
 <restriction base="string">
  <enumeration value="scheduled"/>
  <enumeration value="ondemand"/>
 </restriction>
</simpleType>
<complexType name="TimeAndURLType">
 <simpleContent>
  <extension base="anyURI">
   <attribute name="mode" type="cr:DeliveryModeType" use="optional"
default="scheduled"/>
   <attribute name="start" type="dateTime" use="required"/>
   <attribute name="duration" type="duration" use="optional"/>
   <attribute name="end" type="dateTime" use="optional"/>
   <attribute name="instanceMetadataId" type="metadata:InstanceMetadataIdType"
use="optional"/>
  </extension>
 </simpleContent>
</complexType>
<complexType name="LocationsResultType">
 <sequence maxOccurs="unbounded">
  <choice>
   <element name="Locator" type="CR:LocatorType"/>
   <element name="DecomposedLocator" type="CR:TimeAndURLType"/>
  </choice>
 </sequence>
</complexType>
</schema>
```

FIG. 7

```
<?xml version='1.0' encoding='ISO-8859-9'?>
<ContentReferencingTable xmlns='urn:tva:ContentReferencing:2005'
xmlns:xsi='http://www.w3.org/2001/XMLSchema-instance' version='1'>
 <Result CRID='crid://bbc.co.uk/1195421736' status='resolved' complete='true' acquire='any'>
  <LocationsResult>
   <Locator>dvb://233a.4000.4740;b028@2007-04-24T00:00:00Z/PT04H00M</Locator>
  </LocationsResult>
 </Result>
 <Result CRID='crid://bbc.co.uk/1195421735' status='resolved' complete='true' acquire='any'>
  <LocationsResult>
   <Locator>dvb://233a.4000.4740;b027@2007-04-24T04:00:00Z/PT01H00M</Locator>
  </LocationsResult>
 </Result>
</ContentReferencingTable>
```

METHOD OF PROCESSING DATA IN INTERNET PROTOCOL TELEVISION RECEIVER AND INTERNET PROTOCOL TELEVISION RECEIVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue application of U.S. patent application Ser. No. 12/382,183, filed Mar. 10, 2009, now U.S. Pat. No. 8,554,922, issued Oct. 8, 2013, which* claims the benefit of U.S. Provisional Application No. 61/038,421, filed on Mar. 21, 2008, which is hereby incorporated by reference as if fully set forth herein. Also, this application claims the benefit of U.S. Provisional Application No. 61/042,256, filed on Apr. 3, 2008, which is hereby incorporated by reference as if fully set forth herein. This application also claims the benefit of Korean Application No. 10-2009-0003305, filed on Jan. 15, 2009, which is hereby incorporated by reference.

BACKGROUND OF THE INVENTION

1. Field of the Invention

The present invention relates to an Internet protocol television (IPTV) system, and more particularly, to a method of processing data in an IPTV receiver and such an IPTV receiver.

2. Discussion of the Related Art

An existing TV system may be implemented, for example, in the following manner. A cable broadcast provider, terrestrial broadcast provider or satellite broadcast provider transmits contents produced by broadcasters via a transmission medium such as a broadcasting network. Therefore, the user of the TV system can watch the transmitted contents through a TV receiver capable of receiving the transmitted contents via the transmission medium.

However, as digital TV technologies based on digital broadcasting are developed and are commercially available, breaking from existing analog broadcasting, various contents including real-time broadcasts, Contents on Demand (CoD), games and news can be provided to the user using an Internet network connected to each home, besides existing transmission media.

Such an IPTV receiver providing various contents using an Internet network has various advantages. For example, differently from general terrestrial broadcasting, cable broadcasting or satellite broadcasting, the user can watch a desired content at a desired time.

On the other hand, recently, there has been a discussion on improvements in network-related problems, etc. in an IPTV broadcasting environment. However, a concrete protocol capable of solving such problems has not been defined.

SUMMARY OF THE INVENTION

Accordingly, the present invention is directed to a method of processing data in an IPTV receiver and such an IPTV receiver that substantially obviate one or more problems due to limitations and disadvantages of the related art.

An object of the present invention is to provide a method of processing data in an IPTV receiver and such an IPTV receiver that can improve network-related problems in an IPTV broadcasting environment.

Another object of the present invention is to definitely define a data protocol capable of rapidly processing various contents (for example, CoD) in an IPTV broadcasting environment in which an IP multimedia subsystem (IMS) is introduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data in an Internet protocol television (IPTV) receiver includes: transmitting a request signal for resolution of a content reference identifier (CRID) corresponding to a content; receiving location information including a session initiation protocol-uniform resource identifier (SIP-URI) and a session description protocol-uniform resource locator (SDP-URL), wherein the SIP-URI and the SDP-URL correspond to the CRID; requesting a server corresponding to the SDP-URL to transmit a session description protocol (SDP) file by using the received SDP-URL; and receiving the SDP file from the server.

In another aspect of the present invention, an Internet protocol television (IPTV) receiver includes: a transmitting unit transmitting a request signal for resolution of a content reference identifier (CRID) corresponding to a content; a first receiving unit receiving location information including a session initiation protocol-uniform resource identifier (SIP-URI) and a session description protocol-uniform resource locator (SDP-URL), wherein the SIP-URI and the SDP-URL correspond to the CRID; a requesting unit requesting a server corresponding to the SDP-URL to transmit a session description protocol (SDP) file by using the received SDP-URL; and a second receiving unit receiving the SDP file from the server.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a view newly defining a schema of Time And URL Type added to BCG information according to one embodiment of the present invention;

FIGS. 5 and 6 are views showing a location resolution schema structure in an IPTV broadcasting environment according to one embodiment of the present invention;

FIG. 7 is a view showing a content referencing table in an IPTV broadcasting environment according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
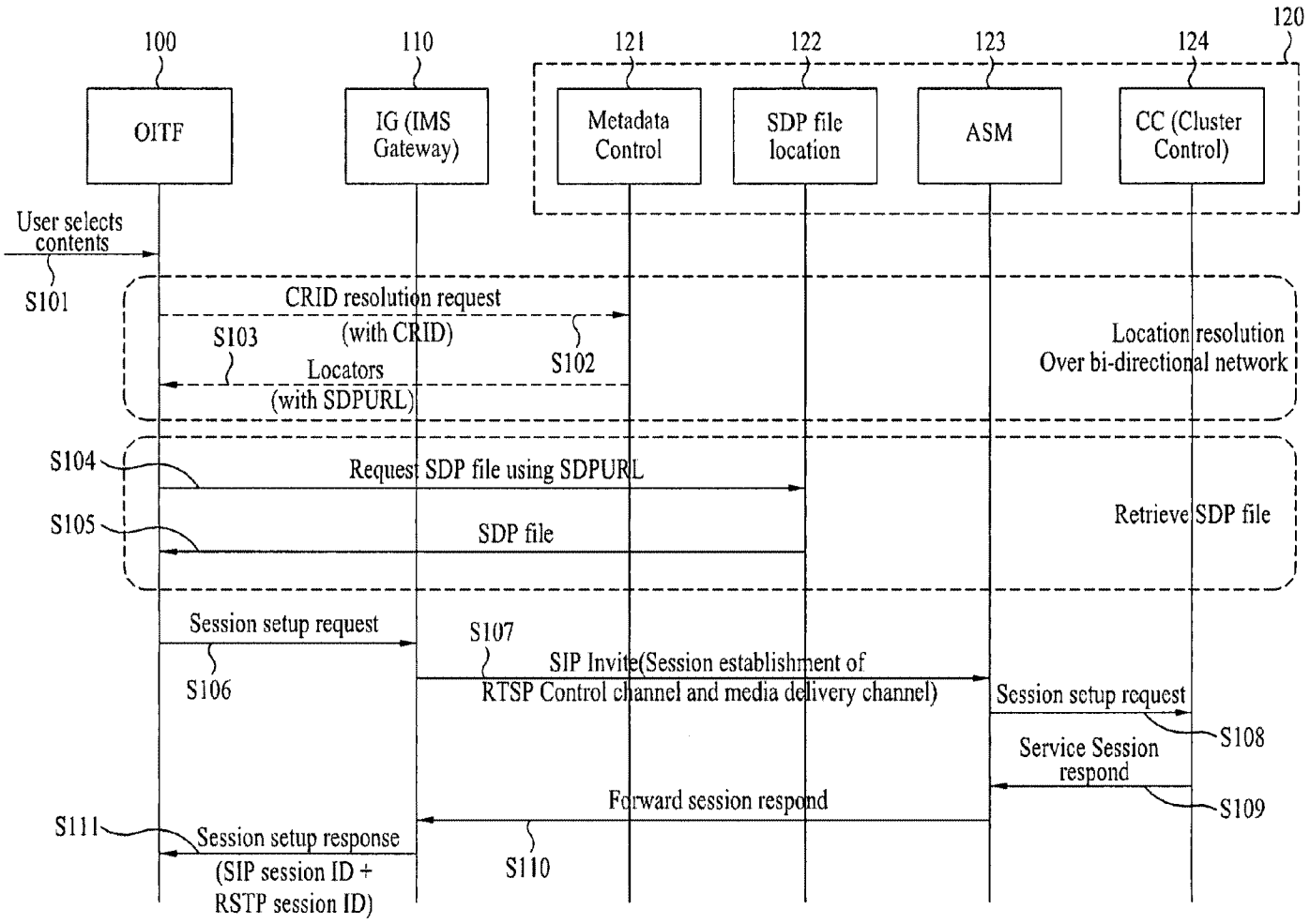
FIG. 1 is a view illustrating a data processing process of a system including an IPTV receiver according to one embodiment of the present invention.

FIG. 1 illustrates a data processing process of a system including an IPTV receiver according to one embodiment of the present invention.

As shown in FIG. 1, the system including the IPTV receiver according to one embodiment of the present invention may be made up of, for example, an open IPTV terminal function (OITF) 100, an Internet protocol multimedia subsystem Gateway (IG) 110, and a service server 120. Particularly, with reference to FIG. 1, a description will be given of a concrete method of processing various contents when the IG 110 is additionally provided on a network differently from an existing IPTV broadcasting environment.

The service server 120 may include, for example, a metadata control 121, a session description protocol (SDP) file location 122, an Authentication and Session Management (ASM) 123, and a cluster control (CC) 124. The IPTV receiver according to one embodiment of the present invention may include only the OITF 100 or both the OITF 100 and IG 110. Also, the metadata control 121 may function as a location resolution server.

In an IPTV broadcasting environment according to one embodiment of the present invention, when the OITF 100 receives a signal for selection of a specific content (for example, CoD) (S101), it transmits a request signal for resolution of a content reference identifier (CRID) corresponding to the specific content to the metadata control 121 (S102). Then, the OITF 100 receives, from the metadata control 121, location information including a session initiation protocol-uniform resource identifier (SIP-URI) and a session description protocol-uniform resource locator (SDP-URL) corresponding to the CRID (S103).

The OITF 100 requests a server corresponding to the SDP-URL to transmit an SDP file by using the received SDP-URL (S104). Here, the server may be, for example, the SDP file location 122 shown in FIG. 1. Then, the OITF 100 can directly receive the SDP file from the server (S105).

That is, according to one embodiment of the present invention, the SDP-URL is defined to be included in the location information, so that an IPTV receiver including an OITF, etc. can more rapidly receive and process a desired SDP file in an IPTV broadcasting environment in which an IP multimedia subsystem (IMS) is additionally provided. A concrete embodiment for additionally defining the SDP-URL in the location information will be described later in more detail with reference to FIG. 3.

Meanwhile, subsequently to the above step S105, the OITF 100 and the IG 110 can control a session setup for processing the specific content by using the received SIP-URI and the received SDP file.

In more detail, as shown in FIG. 1, the OITF 100 transmits a session setup request signal to the IG 110 (S106). The IG 110 transmits a session initiation protocol (SIP) invite signal to the ASM 123 (S107), and the ASM 123 transmits the session setup request signal to the CC 124 (S108). Also, the CC 124 transmits a service session respond signal to the ASM 123 (S109), and the ASM 123 forwards the service session respond signal to the IG 110 (S110). Then, the IG 110 transmits a session setup response signal to the OITF 100 (S111).

On the other hand, although the metadata control 121, SDP file location 122, ASM 123 and CC 124 have been illustrated in FIG. 1 and the associated description, they may be replaced by other modules or servers included in the service server.

Also, according to one embodiment of the present invention, the location information may be defined in a Time And URL Type schema of broadband content guide (BCG) information. The Time And URL Type schema additionally defines SDP mode attribute information identifying a mode for delivery of the SDP file, and SDP-URL attribute information indicating a URL that provides the SDP file. This will be described later in more detail in a description of FIG. 3.

Figure 2:
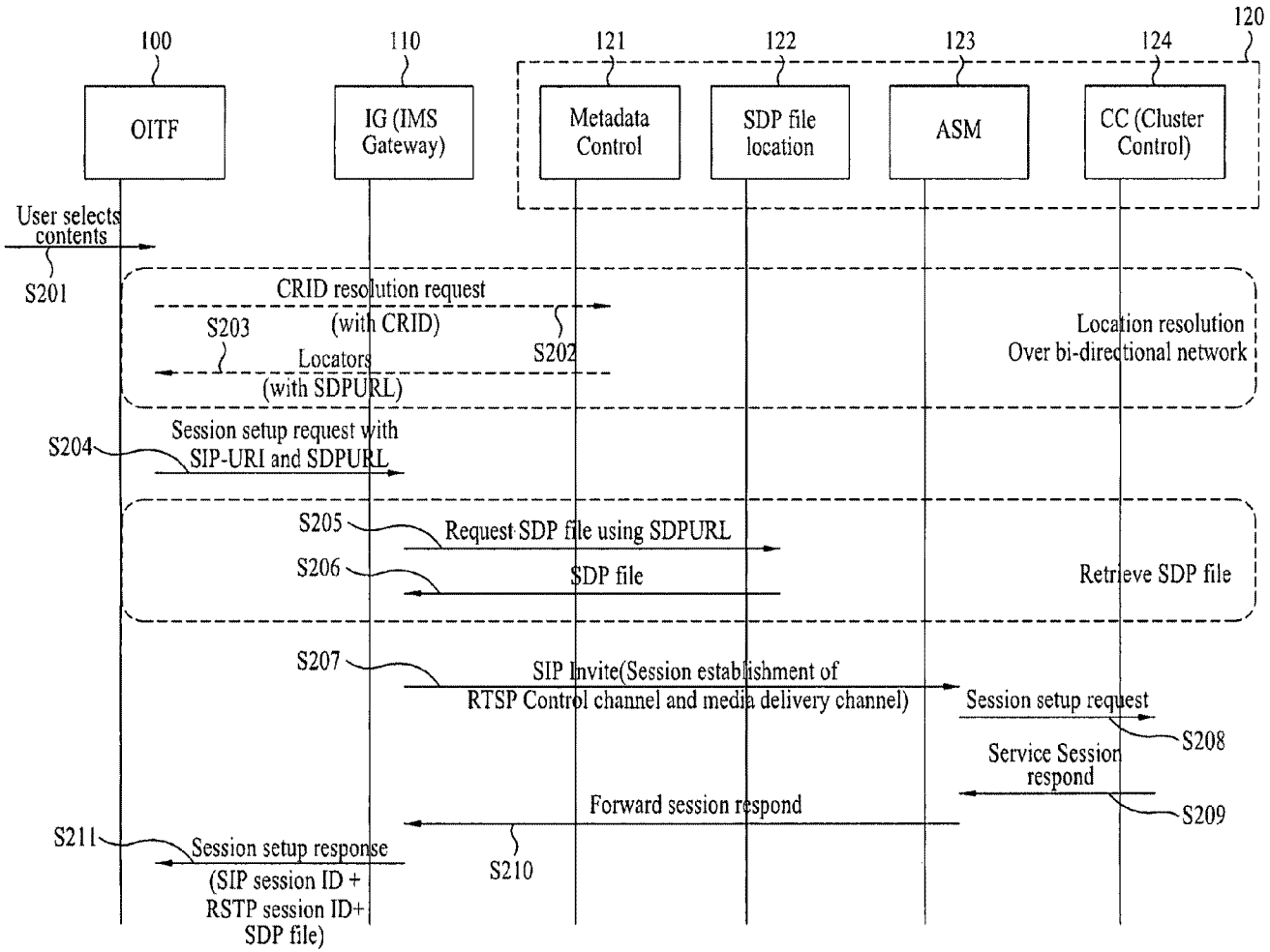
FIG. 2 is a view illustrating a data processing process of a system including an IPTV receiver according to another embodiment of the present invention.

FIG. 2 illustrates a data processing process of a system including an IPTV receiver according to another embodiment of the present invention. In comparison with FIG. 1, in FIG. 2, a session setup can be requested in advance before an SDP file is received.

In an IPTV broadcasting environment according to the present embodiment, when the OITF 100 receives a signal for selection of a specific content (for example, CoD) (S201), it transmits a request signal for resolution of a content reference identifier (CRID) corresponding to the specific content to the metadata control 121 (S202). Then, the OITF 100 receives, from the metadata control 121, location information including a session initiation protocol-uniform resource identifier (SIP-URI) and a session description protocol-uniform resource locator (SDP-URL) corresponding to the CRID (S203).

Then, the OITF 100 requests a session setup to the IG 110 using the received SIP-URI and SDP-URL (S204). The IG 110 requests a server corresponding to the SDP-URL to transmit an SDP file by using the received SDP-URL (S205). Here, the server may be, for example, the SDP file location 122 shown in FIG. 2. Then, the SDP file location 122 transmits the SDP file to the IG 110 (S206).

Then, the IG 110 transmits a session initiation protocol (SIP) invite signal to the ASM 123 (S207), and the ASM 123 transmits a session setup request signal to the CC 124 (S208). Also, the CC 124 transmits a service session respond signal to the ASM 123 (S209), and the ASM 123 forwards the service session respond signal to the IG 110 (S210). Then, the IG 110 transmits a session setup response signal to the OITF 100 (S211).

Therefore, the process of FIG. 1 is useful in the case where the OITF directly receives and processes the SDP file, and the process of FIG. 2 is useful in the case where the IG directly receives and processes the SDP file.

FIG. 3 is a view newly defining a schema of Time And URL Type added to broadband content guide (BCG) information according to one embodiment of the present invention. Hereinafter, with reference to FIG. 3, a more detailed description will be given of attribute information that one embodiment of the present invention intends to newly add to more rapidly process an SDP file in an IPTV broadcasting environment in which an IMS is introduced.

One embodiment of the present invention intends to add an SDP-URL to location information. The term "location information" used in this specification means address information or the like necessary to acquire a content, and may be referred to as a "locator". The SDP file can include a streaming multimedia initiation parameter constituting the content. For detailed example, the SDP file may include media flow information (for example, a media detail, a transport address, session description metadata, etc.) constituting the content.

According to one embodiment of the present invention, a URL from which an SDP file can be directly received is provided in the form of an SDP-URL, and an IPTV receiver can rapidly receive the SDP file by directly accessing the SDP-URL. That is, one embodiment of the present invention includes a process of directly providing the location of a server in which an SDP file is stored, as a URL, and accessing the URL to receive the SDP file. In this case, for example, a hypertext transfer protocol (HTTP) or file transfer protocol (FTP) may be used.

In order to implement the aforementioned process, one embodiment of the present invention intends to extend location information. Because an SIP-URI does not include information about a time at which a specific content can be consumed, it must be delivered through the Time And URL Type schema. Furthermore, SDP-URL information must also be added to the Time And URL Type schema. The Time And URL Type schema extended in this manner is shown in FIG. 3.

In FIG. 3, attribute information particularly indicated by bold letters is one newly additionally defined according to one embodiment of the present invention.

As shown in FIG. 3, attribute information whose attribute name is SDPMode is defined to identify a mode for delivery of an SDP file. The definition of this attribute information has an advantage that a distinction can be made between different SDP file delivery paths. On the other hand, for example, in the case where the SDPMode attribute information has a value "directRef", the Time And URL Type schema additionally defines an SDP-URL. It should be noted here that all names illustrated in the present specification and drawing are nothing but examples and the scope of the present invention should be in principle determined by the appended claims. On the other hand, although attribute information whose attribute name is SDPURI is illustrated in FIG. 3, it defines information about a URL from which an SDP file can be received.

Therefore, a method of requesting an SDP file by an IPTV receiver according to one embodiment of the present invention can include checking the SDP mode attribute information to determine whether a mode for delivery of the SDP file corresponds to a direct SDP file delivery type, checking the SDP-URL attribute information to identify a URL providing the SDP file, if it is determined that the mode for delivery of the SDP file corresponds to the direct SDP file delivery type, and requesting a server corresponding to the identified URL to transmit the SDP file.

Furthermore, location information according to one embodiment of the present invention may be defined in the form of an IP multicast URL, which is a combination of the name of a protocol used for delivery of an SDP file corresponding to a content, an SIP-URI, and a URL providing the SDP file. An example of the format of the IP multicast URL defined in this manner is as follows.

ipm://<host>:<port>?<query>

Here, the ipm can mean the name of a protocol used for delivery of an SDP file corresponding to a specific content, the <host> can mean an IP multicast address of an SIP-URI, and the <port> can mean a UDP port number of the SIP-URI, and the <query> can mean a URL providing the SDP file. Meanwhile, the <query> may be, for example, plural in number, so that various parameters associated with the SDP file can be provided through the <query>.

On the other hand, provided that the IP multicast URL intends to express a source specific IP multicast stream, the <query> may be represented in the following format. Also, the term "source specific multicast" may be expressed as SSM.

SSM=<host-name>

Here, the <host-name> may be an IP address resolved by a domain name service (DNS) server or a host name.

The use of the IP multicast URL in this manner makes it possible to provide information about an SIP-URI and an SDP-URL in one unified URL form.

Figure 4:
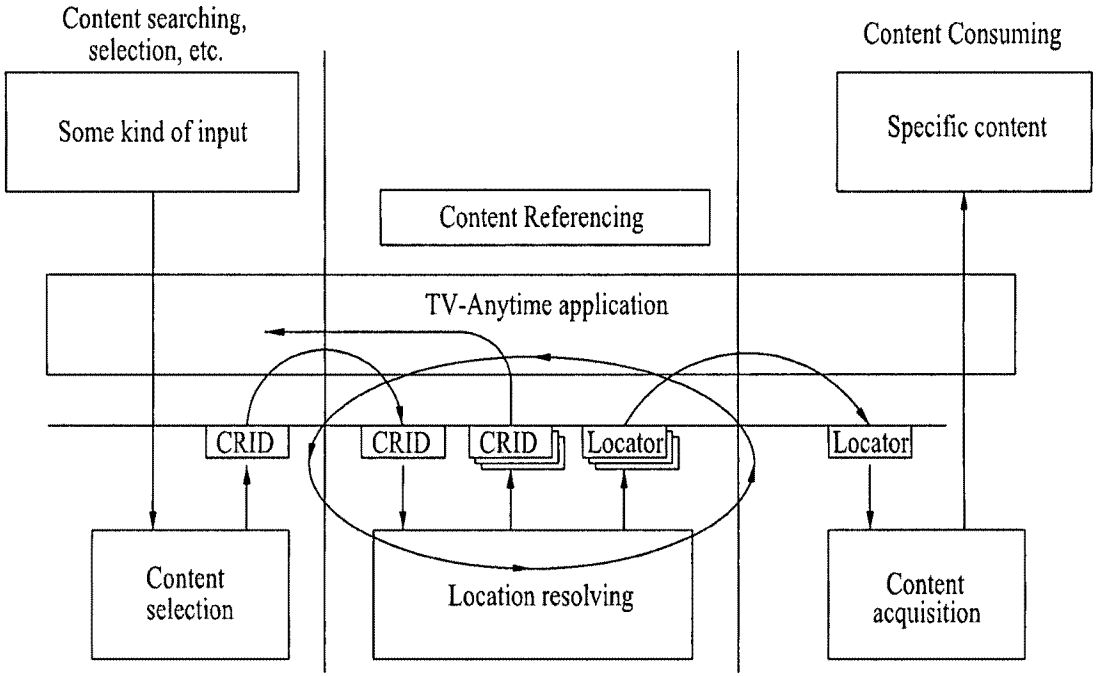
FIG. 4 is a view illustrating an overall content referencing process in an IPTV broadcasting environment according to one embodiment of the present invention.

Also, according to another embodiment of the present invention, it is possible to identify each content using a content reference identifier (CRID). Further, for display of a content selected by the user, location information necessary to acquire a content corresponding to the CRID is acquired through a CRID location resolution process. For example, as shown in FIG. 4 (a view illustrating an overall content referencing process in an IPTV broadcasting environment according to one embodiment of the present invention), a content selected by the user is identified by a CRID, location information including the location of an instance of the content is extracted through a location resolving process for the CRID, and the content can thus be consumed.

For reference, the content may be, for example, a movie "Spiderman", and the instance may be, for example, "Spiderman-HD level picture quality", "Spiderman-SD level picture quality" or "Spiderman-mobile picture quality".

FIGS. 5 and 6 show a location resolution schema structure in an IPTV broadcasting environment according to one embodiment of the present invention. For reference, FIGS. 5 and 6 correspond to one schema structure, which is shown separately in two figures due to restriction in the size of the drawing.

As shown in FIGS. 5 and 6, details of location information corresponding to a CRID detected through a CRID resolution process are defined in Location Result Type, and the location information can be transmitted in a content referencing table.

FIG. 7 shows a content referencing table in an IPTV broadcasting environment according to one embodiment of the present invention.

As shown in FIG. 7, a first result record includes location information (locator) of "dvb://233a.4000.4740; b028@2007-04-24T00:00:00Z/PT04H00M", which is a resolution result of a CRID corresponding to "crid://bbc-.co.uk/1195421736".

That is, as shown in FIGS. 1 to 7, in one embodiment of the present invention, both an SIP-URI and an SDP-URL are transmitted in location information (locator), and a protocol capable of securing both the SIP-URI and SDP-URL prior to a session setup is more definitely defined.

On the other hand, steps S102 and S103 shown in FIG. 1 or steps S202 and S203 shown in FIG. 2 may be collectively named a CRID resolution process, which is a process of searching for location information, or locator. According to another embodiment of the present invention, this CRID resolution process can be implemented in two ways.

Firstly, the CRID resolution process can be implemented using a step of receiving a content referencing table through broadband content guide (BCG) information, and a step of detecting the same location information as that of the CRID from among location information defined in the table.

The aforementioned first method is useful when the BCG information is received in a multicast mode. In this method, a CRID resolution result is transmitted in the BCG information. Also, because this case means that an IPTV receiver has already received and held program information and instance description metadata, the IPTV receiver can complete the CRID resolution process by searching the content referencing table for a result having the same CRID value.

On the other hand, for reference, the BCG information includes detailed information, connection locations, service provider information, service channels, etc. about various contents in an IPTV broadcasting environment. Further, the BCG information may include stream connection information based on a real-time streaming protocol/real-time transport protocol (RTSP/RTP), so that the IPTV receiver may make a direct connection to a streaming server.

Accordingly, the use of the above-stated first method is advantageous in that the CRID resolution process is performed within the IPTV receiver, resulting in no need for a separate interaction process with an external device. Therefore, it is also possible to provide an effect of improving a content consuming speed.

Secondly, the CRID resolution process can be implemented using a step of transmitting a CRID to a location resolution server, and a step of receiving a content referencing table including the same location information as that of the CRID from the server.

The aforementioned second method is useful when a CRID resolution is carried out over a duplex channel. In this method, the CRID is transmitted to the location resolution server, and the content referencing table, which is a resolution result, is received from the server. The use of this method is advantageous in that a relatively small amount of BCG information is transmitted to an IPTV receiver because only program information is contained in the BCG information transmitted to the IPTV receiver. Accordingly, the content provision can be performed more rapidly.

Figure 8:
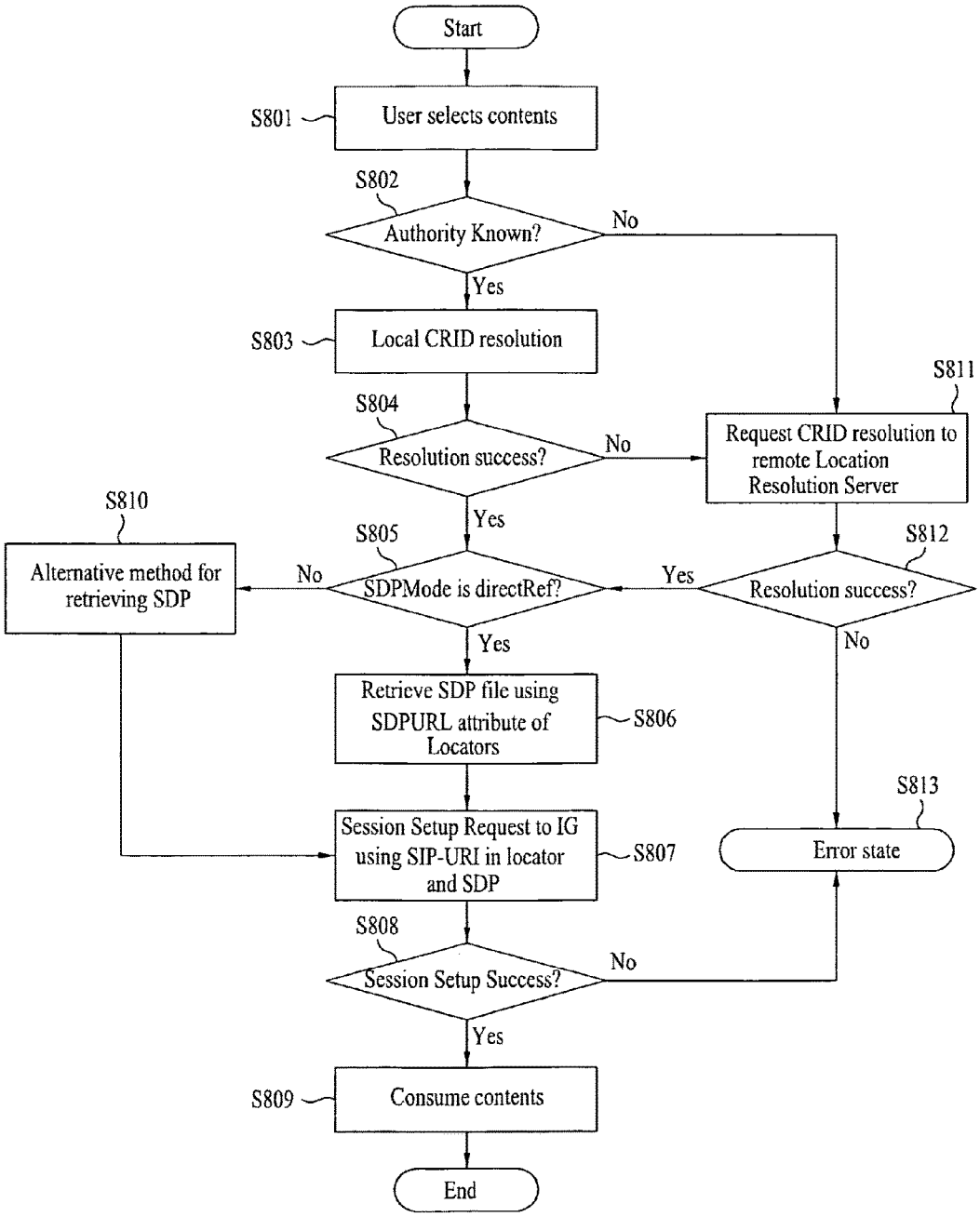
FIG. 8 is a flowchart illustrating a data processing process of an IPTV receiver according to one embodiment of the present invention.

FIG. 8 is a flowchart illustrating a data processing process of an IPTV receiver according to one embodiment of the present invention. With reference to FIG. 8, a detailed description will hereinafter be given of the operation of the IPTV receiver of acquiring SDP-URL information through a direct method as stated above.

The user of the IPTV receiver selects a desired content (S801). That is, a control signal at step S801 is transmitted to the IPTV receiver. Also, the IPTV receiver determines whether it already has information about authority of a CRID corresponding to the selected content (S802). That is, this step S802 is a process of determining whether the IPTV receiver can perform a CRID resolution in a local area without communication with a server, etc.

In the case where it is determined at step S802 that the IPTV receiver has the authority information, the IPTV receiver performs the CRID resolution in the local area (S803) and then determines whether the CRID resolution has succeeded (S804).

In the case where it is determined at step S802 that the IPTV receiver does not have the authority information or in the case where it is determined at step S804 that the CRID resolution has not succeeded, the IPTV receiver requests the CRID resolution to a remote location resolution server (S811). Subsequently to step S811, the IPTV receiver determines whether the CRID resolution has succeeded (S812).

If it is determined at step S804 or S812 that the CRID resolution has succeeded, the IPTV receiver determines whether the SDP mode attribute information defined in the Time And URL Type schema shown in FIG. 3 corresponds to a value "directRef" (S805). That is, this step S805 is a process of determining whether SDP-URL information necessary to receive an SDP file is directly defined and transmitted in the Time And URL Type schema shown in FIG. 3.

In the case where it is determined at step S805 that the SDP mode attribute information does not correspond to the value "directRef", the IPTV receiver receives the SDP file through an alternative method (S810). Conversely, in the case where it is determined at step S805 that the SDP mode attribute information corresponds to the value "directRef", the IPTV receiver receives the SDP file using SDP-URL attribute information included in a locator (S806).

Also, the IPTV receiver requests a session setup to an IG using an SDP-URL and an SIP-URI included in the locator (S807) and then determines whether the session setup has succeeded (S808). In the case where it is determined at step S812 that the CRID resolution has not succeeded or in the case where it is determined at step S808 that the session setup has not succeeded, the IPTV receiver regards the current state as an error state (S813).

If it is determined at step S808 that the session setup has succeeded, the IPTV receiver controls to consume the content (S809).

To sum up, according to one embodiment of the present invention, the IPTV receiver performs a local or remote CRID resolution process to acquire location information, or locator. Also, the IPTV receiver determines whether SDP mode attribute information in the locator corresponds to a value "directRef". If the SDP mode attribute information corresponds to the value "directRef", the IPTV receiver accesses an SDP-URL to receive an SDP file therefrom. Then, the IPTV receiver requests a session setup to an IG using an SIP-URI included in the locator and the received SDP file, and then controls to consume a corresponding content.

Figure 9:
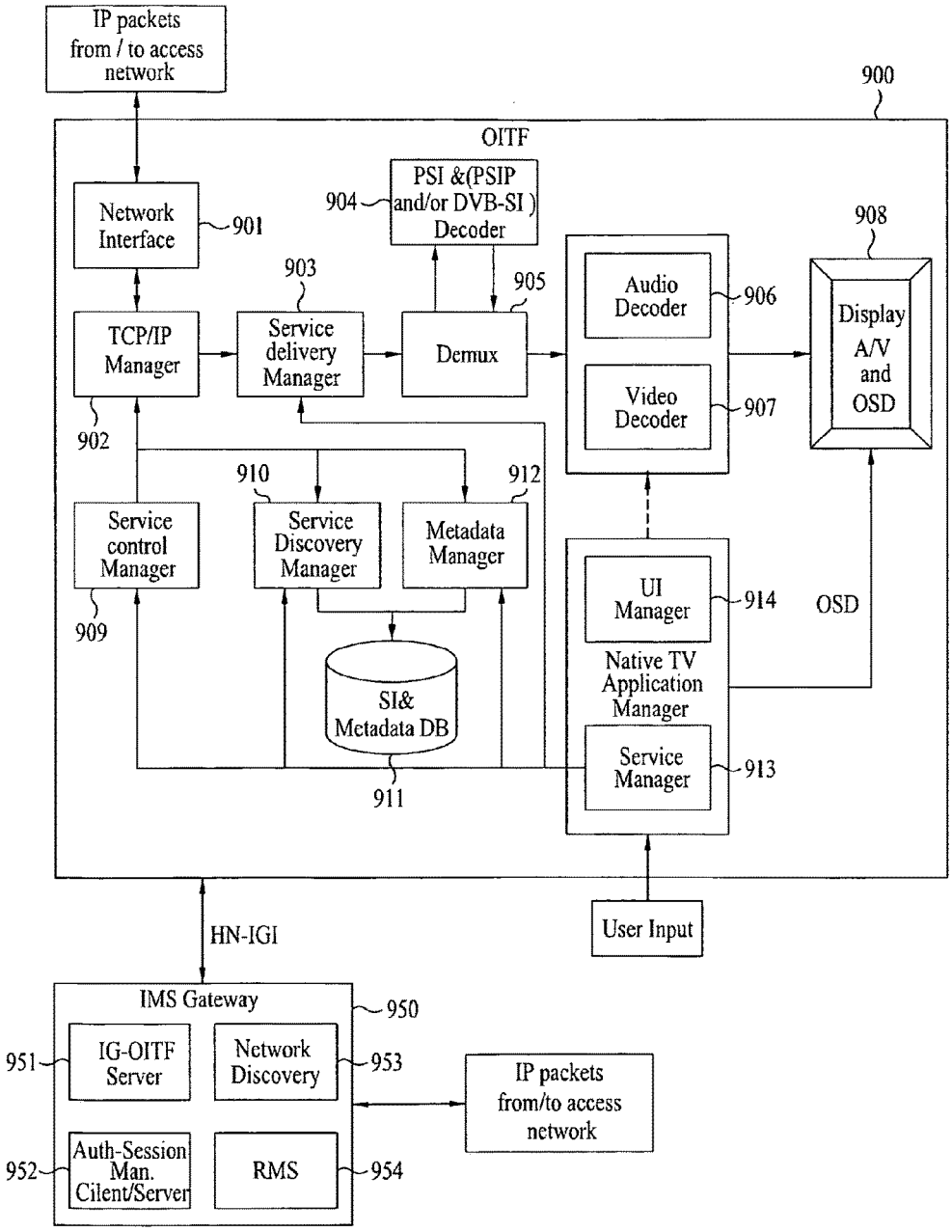
FIG. 9 is a block diagram showing constituent elements of an IPTV receiver according to one embodiment of the present invention.

FIG. 9 is a block diagram showing constituent elements of an IPTV receiver according to one embodiment of the present invention. Hereinafter, with reference to FIG. 9, a description will be given of one embodiment of the present invention that processes contents in an IPTV broadcasting environment in which an IG (IMS Gateway or Internet protocol multimedia subsystem Gateway) is additionally provided.

The IPTV receiver according to one embodiment of the present invention may be designed to include an OITF 900, but not include an IG 950, or designed to include both the OITF 900 and IG 950. Also, the configuration of FIG. 9 is nothing but one embodiment, and the scope of the present invention should be in principle determined by the appended claims, not by FIG. 9.

The OITF 900 includes a network interface 901, TCP/IP manager 902, service delivery manager 903, demultiplexer (Demux) 905, PSI&(PSIP and/or DVB-SI) decoder 904, audio decoder 906, video decoder 907, display A/V and OSD module 908, service control manager 909, service discovery manager 910, metadata manager 912, SI&metadata DB 911, UI manager 914, and service manager 913.

The network interface 901 receives packets from a network and transmits packets to the network. That is, the network interface 901 receives a service, content, etc. from a service provider over the network.

The TCP/IP manager 902 engages in packet delivery from sources to destinations with respect to a packet which is received by the OITF 900 and a packet which is transmitted by the OITF 900. Also, the TCP/IP manager 902 classifies received packets such that the received packets correspond to appropriate protocols, and outputs the classified packets to the service delivery manager 903, service discovery manager 910, service control manager 909, and metadata manager 912.

The service delivery manager 903 takes charge of control of service data received. For example, the service delivery manager 903 may use an RTP/RTCP for control of real-time streaming data. When the real-time streaming data is transmitted using the RTP, the service delivery manager 903 parses the received data packet according to the RTP and delivers the parsed packet to the demultiplexer 905 or stores the parsed packet in the SI&metadata DB 911 under control of the service manager 913. Also, the service delivery manager 903 feeds information received from the network back to a service providing server using the RTCP.

The demultiplexer 905 demultiplexes a received packet into audio data, video data, program specific information (PSI) data, etc. and transmits the audio data, video data, PSI data, etc. to the audio and video decoders 906 and 907 and the PSI&(PSIP and/or DVB-SI) decoder 904, respectively.

The PSI&(PSIP and/or DVB-SI) decoder 904 decodes service information such as program specific information (PSI). That is, the PSI&(PSIP and/or DVB-SI) decoder 904 receives and decodes a PSI section, a Program and Service Information Protocol (PSIP) section, a DVB-service information (SI) section, etc. demultiplexed by the demultiplexer 905.

Also, the PSI&(PSIP and/or DVB-SI) decoder 904 decodes the received sections to create a database about the service information, and stores the database about the service information in the SI&metadata DB 911.

The audio and video decoders 906 and 907 decode audio data and video data received from the demultiplexer 905, respectively. The audio data decoded by the audio decoder 906 and the video data decoded by the video decoder 907 are provided to the user through the display A/V and OSD module 908.

The UI manager 914 and the service manager 913 manage the entire state of the OITF 900, provide a user interface and manage other managers.

The UI manager 914 provides a graphic user interface (GUI) for the user using an on-screen display (OSD), etc., and receives a key input from the user and performs an operation of the receiver based on the key input. For example, if the UI manager 914 receives a key input for channel selection from the user, then it transmits the received key input to the service manager 913.

The service manager 913 controls service-associated managers such as the service delivery manager 903, service discovery manager 910, service control manager 909, and metadata manager 912.

Also, the service manager 913 creates a channel map, and selects a channel by using the channel map based on the key input received from the user interface (UI) manager 914. The service manager 913 receives service information of the selected channel from the PSI&(PSIP and/or DVB-SI) decoder 904 and sets an audio/video packet identifier (PID) of the selected channel in the demultiplexer 905 based on the received service information.

The service discovery manager 910 provides information required for selection of a service provider. If the service discovery manager 910 receives a signal for channel selection from the service manager 913, then it searches for a corresponding service using the information.

The service control manager 909 takes charge of selection and control of a service. For example, the service control manager 909 performs the service selection and control by using an IGMP or RTSP when the user selects a live broadcasting service as in an existing broadcasting system, and by using the RTSP when the user selects a service such as Video On Demand (VOD). The RTSP can provide a trick mode for real-time streaming. Also, the service control manager 909 can initiate and manage a session through an IMS gateway by using an IP multimedia subsystem (IMS) and a session initiation protocol (SIP). These protocols are nothing but one embodiment and different protocols may be used according to different embodiments.

The metadata manager 912 manages service-associated metadata and stores the metadata in the SI&metadata DB 911.

The SI&metadata DB 911 stores the service information decoded by the PSI&(PSIP and/or DVB-SI) decoder 904, the metadata managed by the metadata manager 912, and the information required for service provider selection provided by the service discovery manager 910. Also, the SI&metadata DB 911 may store setup data of a system, etc.

This SI&metadata DB 911 may be implemented by a Non-Volatile RAM (NVRAM) or flash memory.

On the other hand, the IG 950 is a gateway that collects functions necessary to access an IMS-based IPTV service based on an IMS core network. This IG 950 includes an IG-OITF server 951, network discovery 953, authentication/session management client/server 952, and RMS 954.

The OITF 900 can use the IMS-based IPTV service by interfacing with the IG 950. The IG 950 and the OITF 900 are interconnected via, for example, an HN-IGI interface, which can process a function provided by the IG 950 such that the OITF 900 can use the IMS-based IPTV service.

The IG-OITF server 951 provides a function of the authentication/session management client/server 952 to the OITF 900. The IG-OITF server 951 can provide the function of the authentication/session management client/server 952 to the OITF 900 through a protocol such as a hypertext transfer protocol (HTTP).

The network discovery 953 searches for an IMS server and performs an access to the IMS server.

The authentication/session management client/server 952 performs subscriber authentication, and session management required on a managed network.

The RMS 954 performs a remote management function in a managed environment.

Hereinafter, the operation of an IPTV receiver according to one embodiment of the present invention will be described with reference to FIGS. 1 to 8. Here, the IPTV receiver may be designed to include an OITF, but not include an IG, or designed to include both the OITF and IG.

A transmitting unit of the OITF 900 transmits a request signal for resolution of a CRID corresponding to a content. Here, the network interface 901 and the TCP/IP manager 902 may be designed to take charge of the function of the transmitting unit.

A first receiving unit of the OITF 900 receives location information including an SIP-URI and an SDP-URL corresponding to the CRID. This location information may be illustrated as in FIG. 3, and the network interface 901 and the TCP/IP manager 902 may be designed to take charge of the function of the first receiving unit.

A requesting unit of the OITF 900 requests a server corresponding to the SDP-URL to transmit an SDP file by using the received SDP-URL. Here, the service control manager 909 may be designed to take charge of the function of the requesting unit. For reference, the server may be the SDP file location 122 among the servers shown in FIG. 1 or 2.

A second receiving unit of the OITF 900 receives the SDP file from the server. Here, the network interface 901 and the TCP/IP manager 902 may be designed to take charge of the function of the second receiving unit. Also, the first and second receiving units may be implemented into a single receiving unit.

The service discovery manager 910 and metadata manager 912 of the OITF 900 controls a session setup for processing the content by using the directly received SDP file.

Of course, other modules shown in FIG. 9 or other modules in the IPTV receiver, not shown, may be designed to take charge of the above functions.

As stated above in conjunction with FIGS. 1 to 9, according to one embodiment of the present invention, an SDP file necessary for a session setup can be more rapidly secured based on extended BCG information in an IMS-based IPTV broadcasting environment. Further, according to another embodiment of the present invention, it is also possible to cope with a variety of SDP file receiving methods that may be introduced in the future.

Therefore, provided that the present invention is applied to an IPTV broadcasting system, it is possible to improve network-related problems in an IPTV broadcasting environment.

Further, provided that the present invention is applied to an IPTV broadcasting system, it is possible to definitely define a data protocol capable of rapidly processing various contents (for example, CoD) in an IPTV broadcasting environment in which an IMS is introduced.

Further, provided that the present invention is applied to an IPTV broadcasting system, it is possible to provide an SDP file in an extended BCG while maintaining backward compatibility with an existing IPTV system.

In addition, provided that the present invention is applied to an IPTV broadcasting system, it is possible to more rapidly process a given content in an IPTV broadcasting environment in which an IMS is introduced.

The method described herein may be presented in the form of a program command, which may be executed through a diversity of computer devices, so as to be recorded (or written) in a computer readable medium. Herein, the computer readable medium may include a program command, a data file, and a data structure individually or in combination. The program command recorded in the medium may correspond either to a device (or medium) specially designed for the embodiment of the present invention or to a usable device (or medium) disclosed to a computer software manufacturer. Examples of computer readable media may include a hard disk, magnetic media (e.g., floppy disks and magnetic tapes), a CD-ROM, optical media such as DVD, magneto-optical media such as floptical disks, and a hardware device specially configured to store and perform program commands, such as ROM, RAM, and flash memories. Examples of the program command may include a machine language code created by a compiler, as well as a high-level language code that can be executed by the computer using an interpreter. The above-described hardware device may be configured to be operated using at least one software module in order to perform an operation, and vice versa.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of retrieving at least one parameter of a SDP (session description protocol) file prior to a session setup in an open IPTV terminal function (OITF) receiver, the method comprising:

performing a content reference identifier (CRID) location resolution process of mapping a CRID to either other CRIDs or a location information, wherein the location information provides additional data to retrieve the content;

retrieving the at least one SDP parameter prior to the session setup, the retrieving comprising:

firstly requesting by the OITF receiver to an Internet protocol multimedia subsystem Gateway (IG) on a home network interface-IG interface (HNI-IGI) interface, the at least one SDP parameter;

secondly requesting by the IG to a network, the at least one SDP parameter;

retrieving, by the IG, the at least one SDP parameter from the network;

forwarding the at least one SDP parameter from the IG to the OITF receiver; and performing the process of the session setup after the OITF receiver has retrieved the at least one parameter, wherein the location information is defined in a Time And uniform resource locator (URL) Type schema of broadband content guide (BCG) information, and the Time And URL Type schema additionally defines SDP mode attribute information identifying a mode for delivery of the content, and SDP-URL attribute information indicating a URL that provides the content.

2. A computer-readable recording medium for recording a program for execution of the method of claim 1.

3. An open IPTV terminal function (OITF) receiver of retrieving at least one parameter of a SDP (session description protocol) file prior to a session setup, the OITF receiver comprising:

a [performing unit configured to perform] *processor that performs* a content reference identifier (CRID) location resolution process of mapping a CRID to either other CRIDs or a location information, wherein the location information provides additional data to retrieve the content;

a retrieving [unit configured to retrieve] *processor that retrieves* the at least one SDP parameter prior to the session setup, the retrieving comprising:

firstly requesting by the OITF receiver to an Internet protocol multimedia subsystem Gateway (IG) on a home network interface-IG interface (HNI-IGI) interface, the at least one SDP parameter;

secondly requesting by the IG to a network, the at least one SDP parameter;

retrieving, by the IG, the at least one SDP parameter from the network;

forwarding the at least one SDP parameter from the IG to the OITF receiver; and a controlling [unit configured to perform] *processor that performs* the process of the session setup after the OITF receiver has retrieved the at least one SDP parameter, wherein the location information is defined in a Time And uniform resource locator (URL) Type schema of broadband content guide (BCG) information, and the Time And URL Type schema additionally defines SDP mode attribute information identifying a mode for delivery of the content, and SDP-URL attribute information indicating a URL that provides the content.

* * * * *